United States Patent Office 3,324,106
Patented June 6, 1967

3,324,106
1-PHENYL-5-PYRAZOLONE-3-CARBONAMIDE DISAZO DYESTUFFS
Guy Charles Maurice du Peloux, Boisguillaume, and Jean Marie Louis Leroy, Rouen, France, assignors to Etablissements Kuhlmann, Paris, France
No Drawing. Filed Dec. 11, 1963, Ser. No. 329,907
Claims priority, application France, Sept. 25, 1959, 806,030
2 Claims. (Cl. 260—160)

The present application is a continuation-in-part of applicants' copending application Ser. No. 57,613, filed Sept. 22, 1960, and now abandoned.

The present invention concerns new dyestuffs for linear polyester fibres and processes for the colouration of these fibres.

The development of synthetic fibres which becomes more important every day, the manifold conditions under which they are used and the severe treatments, especially the heat treatments, to which the homogeneous fabrics from which they are made or the mixed fabrics in the composition of which they form a part are more and more frequently subjected make it essential to have available dyestuffs which are specially adapted to the dyeing or printing of these fibres.

A considerable number of the dyestuffs used up to now for this purpose are not capable of meeting the ever more severe demands of fastness which are prescribed by the conditions of use. This is particularly true in the field of dyestuffs intended for dyeing fibres based on polyesters, the high melting point if which has made possible heat treatments, such as permanent pleating, at temperatures of the order of 200° C. This clearly assumes that the dyestuffs used in dyeing or printing these fibres must resist these treatments; which means that neither their shade nor their brightness must vary and that in addition they must not sublime.

It has now been found that by using amides of 1-aryl-5-pyrazolone-3-carboxylic acids as coupling compounds one can obtain mono- or dis-azo dyestuffs which dye fibres based on polyesters in shades from yellow to bordeaux, which possess, as well as very good general fastness, a very good fastness to light and an excellent resistance to sublimation.

These new dyestuffs correspond to the general formula:

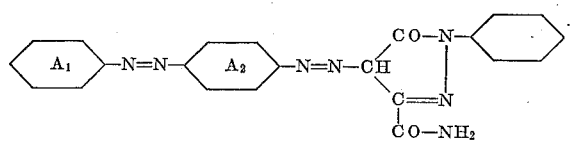

wherein the benzene nuclei $A_1$ and $A_2$ are each substituted by a member selected from the group consisting of the hydrogen atom, the methyl, methoxy and ethoxy groups.

The affinity of the dyestuffs of the above general formula for linear polyester fibres was quite unexpected. They certainly have no affinity for cellulose acetate.

It was also quite unexpected that by using preformed dyestuffs of the above general formula on linear polyester fibres one can obtain shades that are fast to light and to sublimation.

If the colouration of linear polyester fibres is effected by the application of the components of a dyestuff, so that the dyestuff is formed on the fibres, then it is not possible to obtain shades that are fast to sublimation. This is because one obtains on the fibres not only the desired dyestuff but also in excess of base or of coupling component and possibly also a product derived from the partial decomposition of the diazo derivative of the base.

By means of the process of the present invention, using a pre-formed dyestuff to colour linear polyester fibres, only a single operation is involved instead of the two or three of the components of the dyestuff are used and this constitutes a technical and economic advantage.

The dyestuffs of the above general formula previously dispersed, may be used for dyeing polyester fibres either at ordinary pressure in the presence of carriers, or under pressure with or without carriers. These dyestuffs also find an interesting application in frame or roller printing or by the Vigoureux process on textile materials based on polyester fibres. The alkylaryl sulphonates and the products of condensation of sulphonated aromatic derivatives with aldehydes, more particularly dinaphthylmethane sulphonates, form auxiliary products which are particularly valuable for these applications.

The examples below, in which the parts are by weight unless the contrary is stated, illustrate the invention without limiting it.

*Example 1*

25 parts of 4-diethylsulphonamido-2-amino-anisole are made into a paste in 25 parts by volume of 19° Bé. hydrochloric acid and 500 parts of water. The mixture is cooled to 0° C. and diazotised by means of 138 parts by volume of a solution containing 50% by weight of sodium nitrite. The diazo derivative thus obtained is introduced into a solution of 20.3 parts of 1-phenyl-5-pyrazolone-3-carbonamide in 500 parts of water and 13 parts by volume of 35° Bé. caustic soda, to which has been added 40 parts of sodium dodecylbenzene sulphonate and 40 parts of sodium carbonate. After coupling, the dyestuff is isolated according to the usual procedure. 100 parts of fibers based on ethylene glycol polyterephthalate, previously degreased, 1 part of the above dyestuff and 2 parts of a dispersing agent such as the sodium salt of dinaphthylmethane-disulphonic acid are introduced into an apparatus which allows operation under pressure, and then dyeing is effected at 130–135° C. under a pressure of 2 kg./cm.² for an hour. The fibre is then treated in the hot in an alkaline reducing bath containing 1 to 2 g. per litre of octylphenol/ethylene oxide condensate. The polyester fibre is dyed a bright yellow shade of good general fastness.

*Example 2*

16.8 parts of 5-nitro-2-amino-anisole are kneaded for 12 hours with 40 parts by volume of 19° Bé. hydrochloric acid. After making the volume up to 700 parts, the suspension of the base is diazotised by means of 138 parts by volume of solution containing 50% by weight of sodium nitrite. The filtered solution of the diazo compound is then run into a bath of 1-phenyl-5-pyrazolone-3-carbonamide identical with that of Example 1. After isolation and dispersion, the dyestuff obtained dyes polyester fibre an orange-yellow shade.

*Example 3*

19.7 parts of 4-amino-azobenzene are kneaded for 12 hours with 40 parts by volume of 19° Bé. hydrochloric acid and diazotised under the same conditions as those indicated in Example 2. The filtered solution of the diazo compound is then introduced into a bath of 1-phenyl-5-pyrazolone-3-carbonamide prepared in the same manner as in Example 1. The dyestuff obtained possesses an excellent affinity for polyester fibre, which is dyed an orange shade having very good general fastness. This same dyestuff also enables orange shades to be obtained which have good fastness on "nylon" (dyed at 100° C.), on "Rislan" (dyed at 115° C.) and on cellulose triacetate (dyed at 130° C.). "Nylon" is of course a synthetic linear superpolyamide and "Rilsan" is an internal polyamide of ω-aminoundecanoic acid.

sate from octylphenol and ethylene oxide. The fabric is dyed an orange shade endowed with excellent fastness, the reserved parts being perfectly white.

| Examples | Diazotised base | Coupling Compound used | Shade obtained on polyester fibres |
|---|---|---|---|
| 4 | 1-amino-2-trifluoromethyl-4-chlorobenzene | 1-phenyl-5-pyrazolone-3-carbonamide | Golden yellow. |
| 5 | 2-amino-4-butyl-sulphonamide-anisole | do | Yellow. |
| 6 | 2-amino-4-benzyl-sulphonyl-anisole | do | Do. |
| 7 | 2-chloro-aniline | do | Do. |
| 8 | 3,2'-dimethyl-4-amino-azobenzene | do | Orange. |
| 9 | 3-methoxy-4-amino-azobenzene | do | Orange-red. |
| 10 | 4-N-cyclohexylcarbamoyl-1-amino-benzene | do | Yellow. |
| 11 | 3,6-diethoxy-4'-methoxy-4-amino-azobenzene | do | Bordeaux. |

*Example 12*

A printing paste is prepared from the following ingredients:

| | Parts |
|---|---|
| Dyestuff prepared according to Example 3 | 6 |
| Sodium dinaphthylmethane disulphonate | 14 |
| Monoethylene glycol | 50 |
| Water | 300 |
| Aqueous solution of sodium chlorate containing 300 g. per litre | 30 |
| Industrial gum | 600 | and it is applied on a grooved roller to a fabric of fibres based on ethylene glycol polyterephthalate which has previously been desized by treatment at 75° C. for 15 minutes with a 1 gm./litre solution of sodium carbonate. The colour is fixed by steaming under pressure at 130–140° C. It is rinsed and treated in the hot with an alkaline reducing bath containing 1 to 2 g. per litre of a conden-

We claim:
1. Azo dyestuffs having the following general formula:

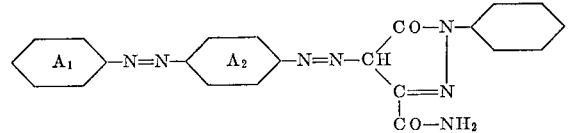

wherein the benzene nuclei $A_1$ and $A_2$ are each substituted by a member selected from the group consisting of the hydrogen atom, the methyl, methoxy and ethoxy groups.

2. An azo dyestuff of the formula:

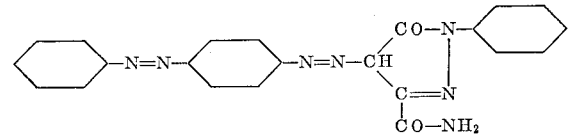

References Cited

UNITED STATES PATENTS

| 2,012,553 | 8/1935 | Thoma | 260—160 |
| 2,457,823 | 1/1949 | Kendall et al. | 260—160 X |
| 2,816,886 | 12/1957 | Brenneisen et al. | 260—160 |
| 2,822,234 | 2/1958 | Breig et al. | 8—71 |
| 2,880,177 | 3/1959 | Lyons et al. | 260—161 X |
| 2,991,144 | 7/1961 | Sandilands et al. | 8—41 |
| 3,023,071 | 2/1962 | Jirou | 260—160 X |
| 3,037,974 | 6/1962 | Kracker et al. | 260—160 |

CHARLES B. PARKER, *Primary Examiner.*

F. D. HIGEL, *Assistant Examiner.*